US012592601B2

(12) United States Patent
Ogawa

(10) Patent No.: US 12,592,601 B2
(45) Date of Patent: Mar. 31, 2026

(54) MOTOR DEVICE

(71) Applicant: MITSUBA Corporation, Gunma (JP)

(72) Inventor: Yuya Ogawa, Gunma (JP)

(73) Assignee: MITSUBA Corporation, Gunma (JP)

( * ) Notice: Subject to any disclaimer, the term of this patent is extended or adjusted under 35 U.S.C. 154(b) by 189 days.

(21) Appl. No.: 18/540,821

(22) Filed: Dec. 14, 2023

(65) Prior Publication Data

US 2024/0364171 A1 Oct. 31, 2024

(30) Foreign Application Priority Data

Apr. 25, 2023 (JP) ................................. 2023-071383

(51) Int. Cl.
| | |
|---|---|
| *H02K 3/44* | (2006.01) |
| *H02K 3/52* | (2006.01) |
| *H02K 21/16* | (2006.01) |
| *F16D 65/16* | (2006.01) |
| *F16D 121/24* | (2012.01) |

(52) U.S. Cl.
CPC .............. *H02K 3/44* (2013.01); *H02K 3/522* (2013.01); *H02K 21/16* (2013.01); *F16D 65/16* (2013.01); *F16D 2121/24* (2013.01); *H02K 2203/09* (2013.01)

(58) Field of Classification Search
CPC .......... H02K 3/44; H02K 3/522; H02K 21/16; H02K 2203/09

USPC ....................................................... 310/45, 71
See application file for complete search history.

(56) References Cited

FOREIGN PATENT DOCUMENTS

| | | | | | |
|---|---|---|---|---|---|
| DE | 112013006945 T5 | * | 12/2015 | ............. | H02K 3/522 |
| JP | 2020005348 | | 1/2020 | | |
| WO | WO-2014112246 A1 | * | 7/2014 | ............ | F04C 15/008 |
| WO | WO-2019146450 A1 | * | 8/2019 | ............... | H02K 3/46 |

* cited by examiner

*Primary Examiner* — Jose A Gonzalez Quinones
(74) *Attorney, Agent, or Firm* — JCIPRNET

(57) ABSTRACT

A motor device includes: multiple conductive members, provided on one side of a stator in an axial direction of a rotor, positioned across a first insulator split body toward a radial direction of the rotor, and connected to a winding start portion and a winding end portion of a coil; inner and outer support walls, provided on one side of the first insulator split body in the axial direction of the rotor and supporting the coil, which are wrapped around the first insulator split body, from inside and outside in the radial direction of the rotor; and a recessed portion, provided on the outer support wall, opening toward the inner support wall and the one side of the first insulator split body in the axial direction of the rotor. The recessed portion is configured between adjacent conductive members when the stator is viewed from one side in the axial direction.

3 Claims, 11 Drawing Sheets

MOTOR DEVICE

CROSS-REFERENCE TO RELATED APPLICATION

This application claims the priority benefits of Japanese application no. 2023-071383, filed on Apr. 25, 2023. The entirety of the above-mentioned patent application is hereby incorporated by reference herein and made a part of this specification.

BACKGROUND

Technical Field

The disclosure relates to a motor device having a stator and a rotor that rotates with respect to the stator.

Description of Related Art

For example, Patent Document 1 (Japanese Patent Application Laid-Open (JP-A) No. 2020-005348) describes a brushless motor having a stator and a rotor that rotates with respect to the stator. In addition, a coil is wrapped around the teeth provided in the stator via an insulator, and a coating agent made of epoxy resin or the like is coated on the coil.

The coating agent is coated on the coil after the stator wrapped with the coil is press-fitted into the motor case. Furthermore, after the coating agent coated on the coil is cured, the coil and the busbar unit are electrically connected.

However, in the technology described in Patent Document 1, after coating the coating agent to the coil, the coil and the busbar unit are electrically connected by welding. Thus, when welding the coil and the busbar unit using a welding machine, there is a risk of damage to the surface of the coating agent, such as part of the coating agent coming off due to welding spatter (fine metal particles).

An object of the disclosure is to provide a motor device that may prevent the surface of a coating agent coated on a coil from being scratched.

SUMMARY

One embodiment of the motor device includes: a stator; and a rotor rotating with respect to the stator. The stator includes: a stator body; teeth, provided on the stator body and protruding toward the rotor; an insulator, mounted to the teeth; and a coil, wrapped around the insulator. The motor device includes: multiple conductive members, provided on one side of the stator in an axial direction of the rotor, extending across the insulator toward a radial direction of the rotor, and electrically connected to end portions of the coil; an inner support wall and an outer support wall, provided on one side of the insulator in the axial direction of the rotor and supporting the coil, which are wrapped around the insulator, from inside and outside in the radial direction of the rotor; and a recessed portion, provided on the outer support wall, opening toward the inner support wall and toward the one side of the insulator in the axial direction of the rotor. The recessed portion is configured between adjacent conductive members when the stator is viewed from one side in the axial direction.

DESCRIPTION OF THE EMBODIMENTS

Hereinafter, one embodiment of the disclosure will be described in detail with reference to the drawings.

<Motor Device>

Figure 1:
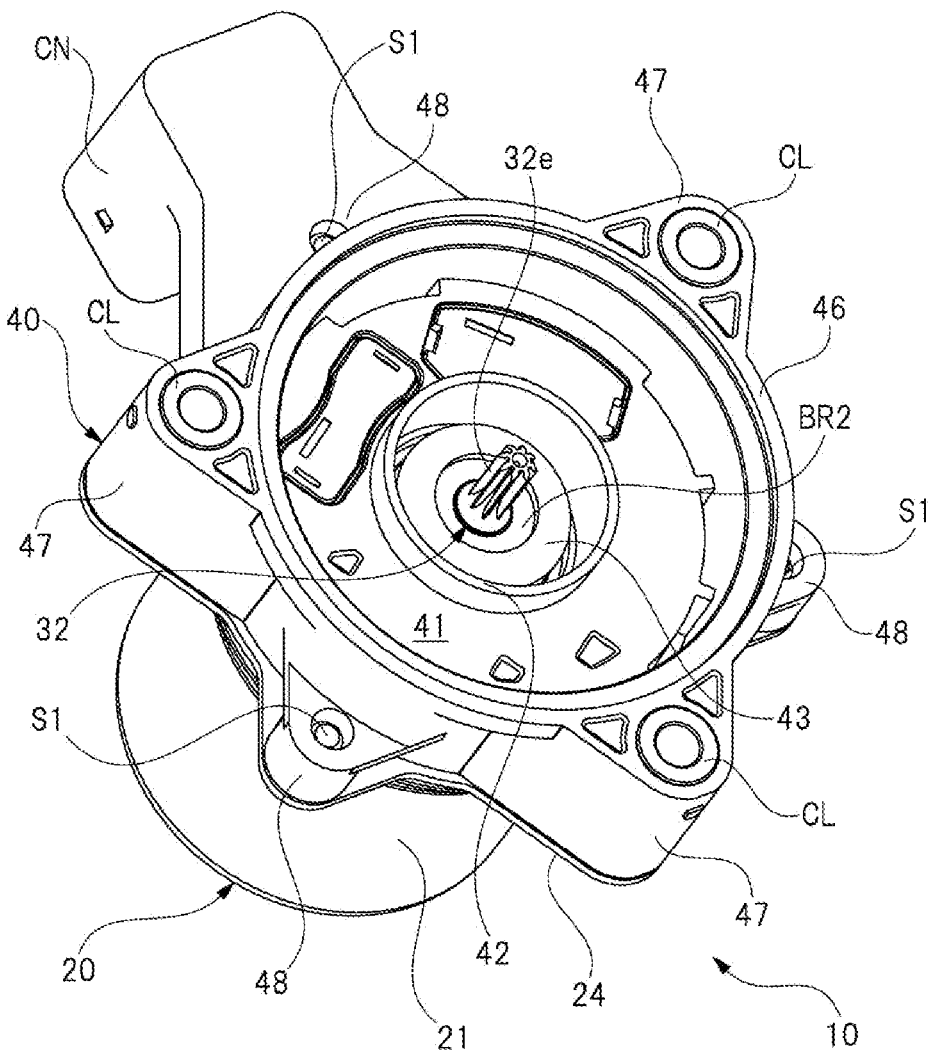
FIG. 1 is a perspective view of the motor device viewed from the bracket side.
Figure 2:
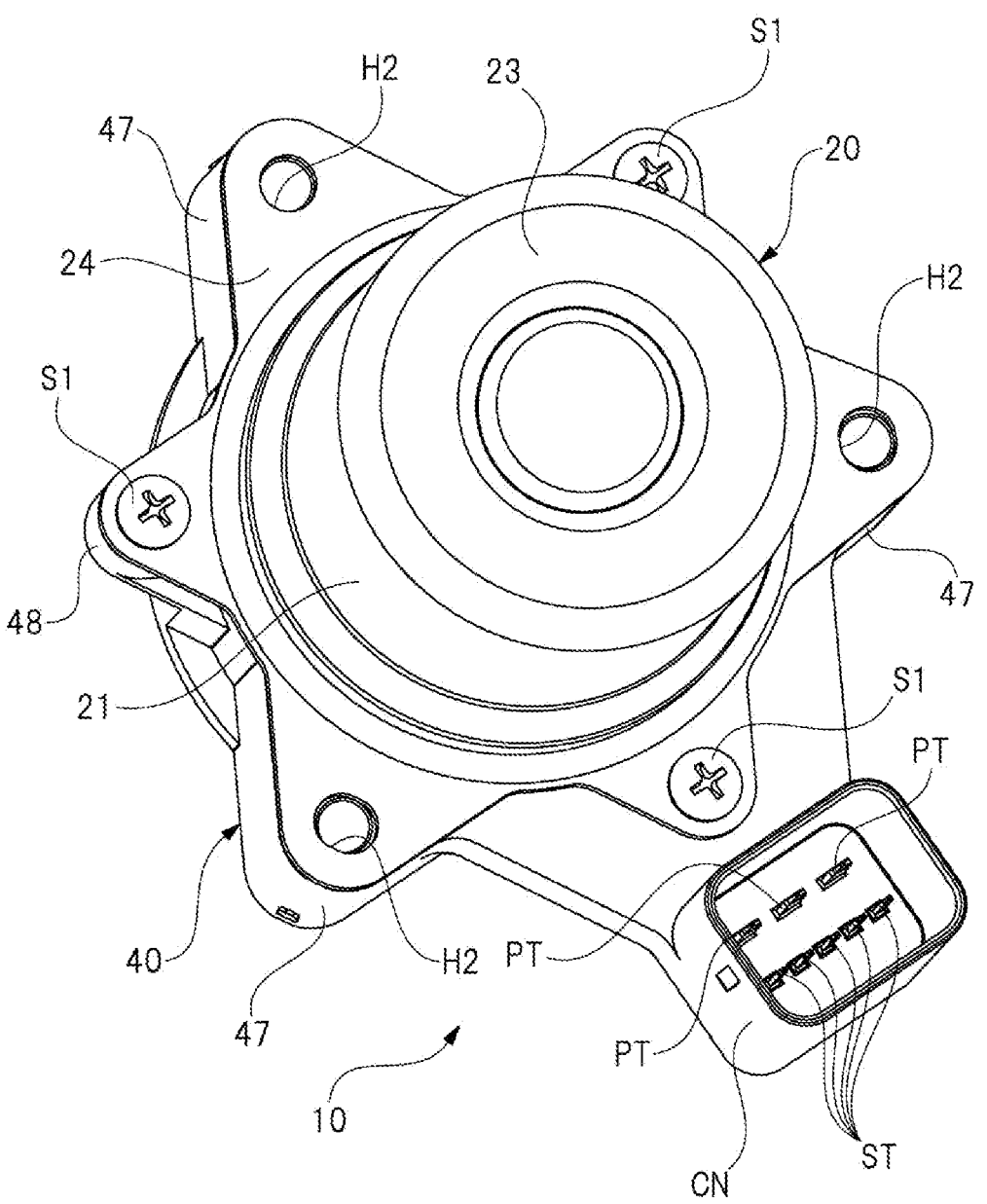
FIG. 2 is a perspective view of the motor device viewed from the case side.
Figure 3:
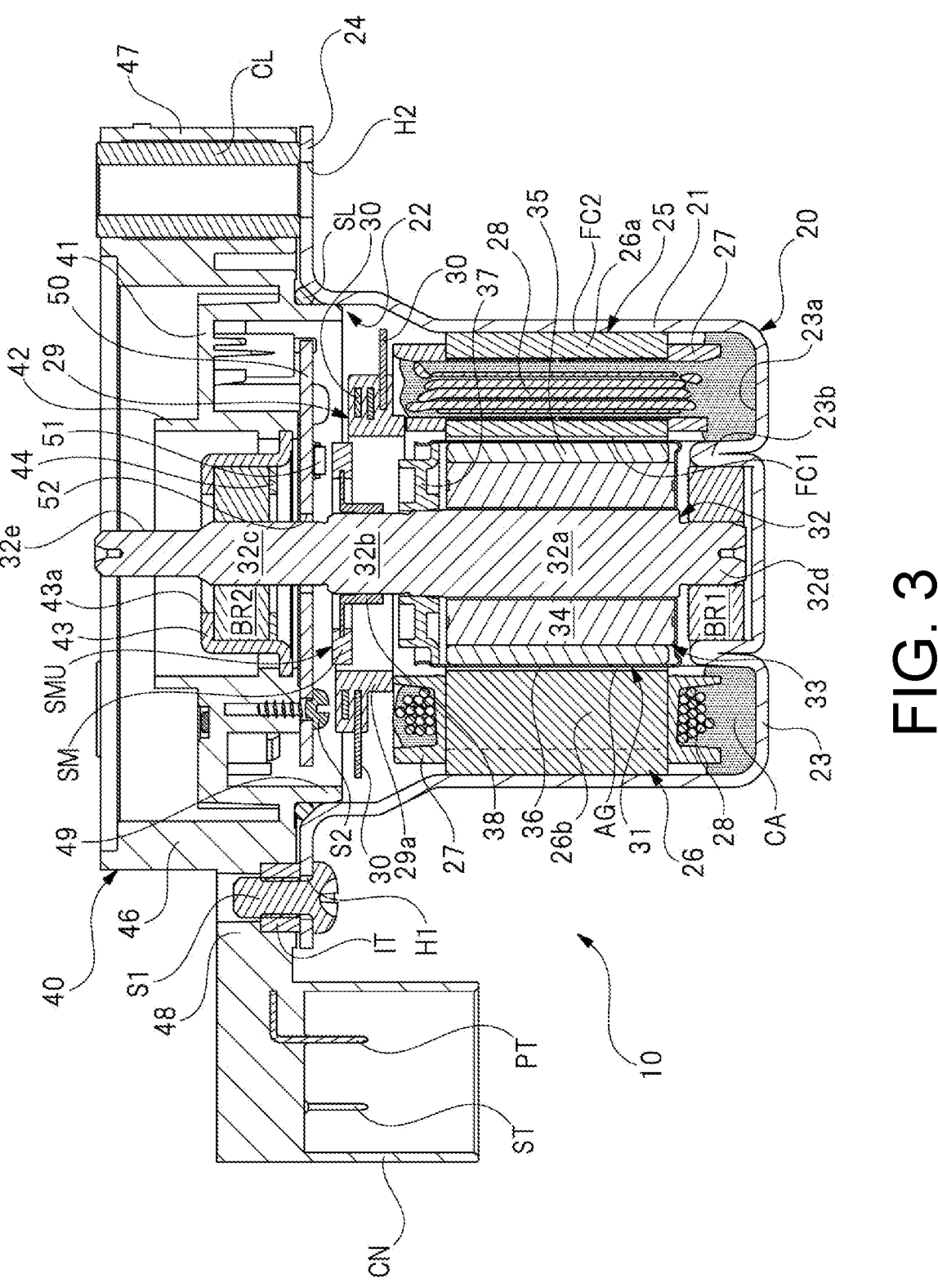
FIG. 3 is a cross-sectional view showing the interior structure of the motor device.
Figure 4:
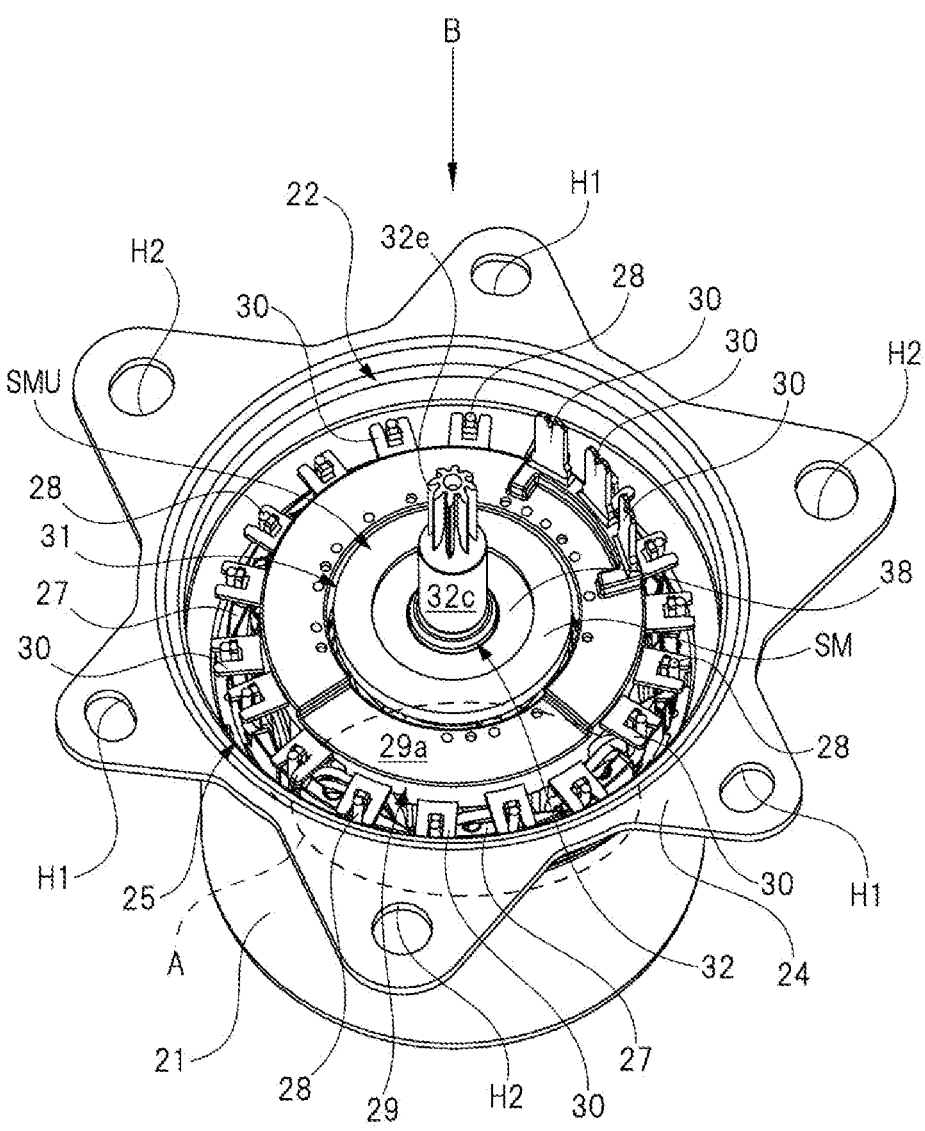
FIG. 4 is a perspective view of the inside of the case.
Figure 5:
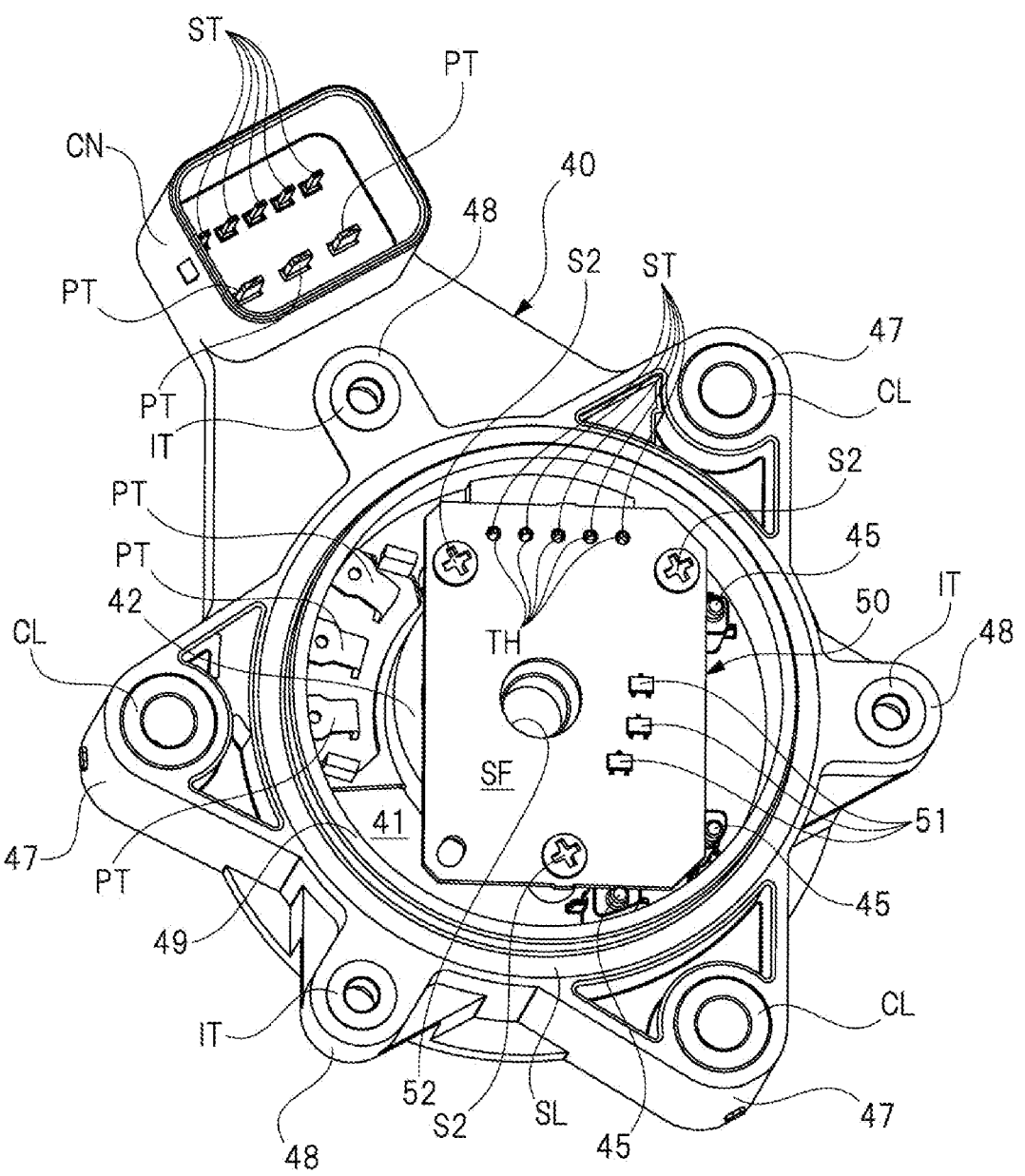
FIG. 5 is a perspective view of the inside of the bracket.

FIG. 1 shows a perspective view of the motor device viewed from the bracket side; FIG. 2 shows a perspective view of the motor device viewed from the case side; FIG. 3 shows a cross-sectional view showing the interior structure of the motor device; FIG. 4 shows a perspective view of the inside of the case; and FIG. 5 shows a perspective view of the inside of the bracket, respectively.

The motor device 10 shown in FIG. 1 to FIG. 3 is used, for example, as a drive source for an electric brake device mounted on a vehicle such as an automobile. The motor device 10 is a brushless motor and has a metal case 20. The case 20 is formed into a bottomed cylindrical shape by deep drawing a metal plate. The case 20 has a cylindrical portion 21, and an opening portion 22 is provided on one side in the axial direction (upper side in FIG. 3) of the cylindrical portion 21, and a bottom wall portion 23 is provided on the other side in the axial direction (lower side in FIG. 3) of the cylindrical portion 21.

As shown in FIG. 4, a flange portion 24 that protrudes outwardly in the radial direction is provided on the one side in the axial direction of the cylindrical portion 21, that is, on the opening portion 22 side. The flange portion 24 is attached to the other side in the axial direction (lower side in FIG. 3) of a resin bracket 40 by a total of three first male thread members S1. In addition, the flange portion 24 is provided with first insertion holes H1 into which the first male thread members S1 are inserted and second insertion holes H2 into which fixing bolts (not shown) for fixing the motor device 10 to an object to be driven (such as an electric brake device) are inserted.

In this way, the opening portion 22 of the metal case 20 is closed by the resin bracket 40. In addition, the first male thread members S1 are tightened with a screwdriver (not shown) having a plus (+) tip.

On the other hand, as shown in FIG. 3, an annular coating agent storage portion 23a is provided inside the bottom wall portion 23. The coating agent storage portion 23a accommodates a coating agent CA made of an epoxy resin adhesive or the like. The coating agent CA has a function of covering the periphery of the coil 28 and protecting the coil 28. In addition, in FIG. 3 and FIG. 10, to make the coating agent CA easier to see, the coating agent CA is shaded.

Furthermore, a bearing mounting cylindrical portion 23b to which a first bearing BR1 is mounted is provided in the center of the coating agent storage portion 23a. Here, the bearing mounting cylindrical portion 23b is formed into a cylindrical shape by folding and standing up a metal plate when forming the case 20 by, for example, deep drawing the metal plate. Here, the first bearing BR1 rotatably supports the bearing support portion 32d of the rotary shaft 32.

<Stator>

As shown in FIG. 3 and FIG. 4, a stator 25 is accommodated in the interior of the case 20. Specifically, the stator 25 is fixed inside in the radial direction of the cylindrical portion 21 by press-fitting or the like. The stator 25 has a stator core 26 formed into a substantially cylindrical shape, and the stator core 26 is formed by laminating multiple thin steel plates. The stator core 26 has an annular core body 26a and multiple teeth 26b provided on the core body 26a and protruding inside in the radial direction.

Furthermore, the stator 25 includes resin insulator members 27 that are mounted to each of the teeth 26b. Then, each of the insulator members 27 is wound with the coils 28 made up of U-phase, V-phase, and W-phase with a predetermined number of turns. That is, the three-phase coils 28 are wound around each of the teeth 26b via the insulator member 27, which is an insulator.

The three-phase coils 28 are arranged alternately in U-phase, V-phase, W-phase, U-phase, V-phase, W-phase, . . . with respect to the circumferential direction of the stator 25. In this way, the stator 25 has the three-phase coils 28.

<Busbar Unit>

Further, as shown in FIG. 3 and FIG. 4, an annular busbar unit 29 is configured on one side (upper side in FIG. 3) of the stator 25 in the axial direction of the rotor 31. The busbar unit 29 includes multiple conductive members 30 that electrically connect the same phase of the three-phase coils 28. These conductive members 30 are held by a circular holding member 29a. The holding member 29a is made of an insulator such as plastic and prevents each of the conductive members 30 from being short-circuited. In this way, multiple conductive members 30 are provided on the one side of the stator 25 in the axial direction of the rotor 31 via the holding member 29a.

Figure 11:
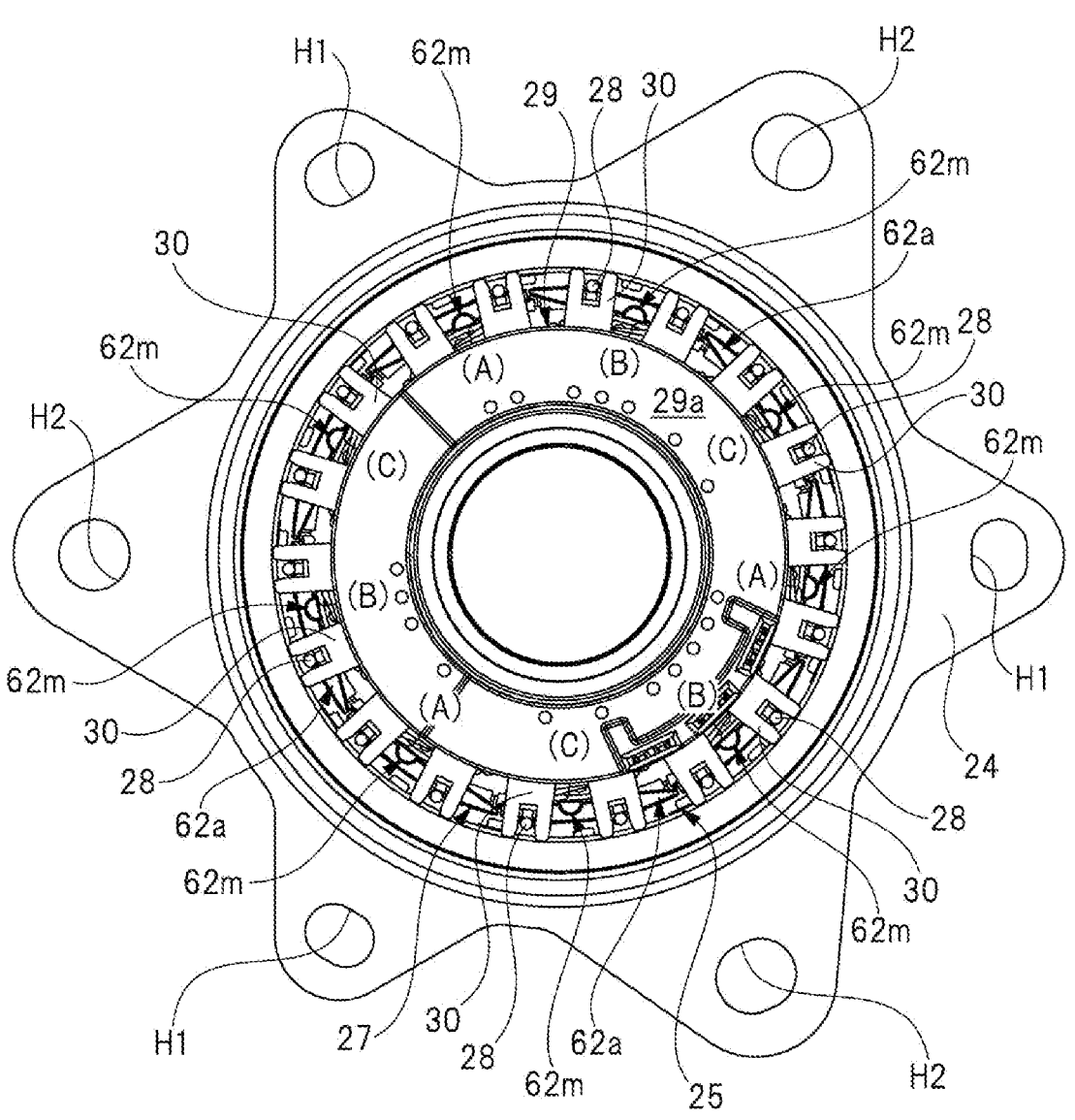
FIG. 11 is a view taken along the arrow B in FIG. 4 (rotor omitted), illustrating the coating agent coating procedure.

Then, one end sides of the conductive members 30 protrude radially outward from the outer circumferential portion of the annular holding member 29a (see FIG. 4 and FIG. 11). Then, the end portions (winding start portion 28a and winding end portion 28b (see FIG. 6 and FIG. 7)) of the three-phase coils 28 are electrically connected to some of the one end sides protruding from the holding member 29a of the conductive member 30 by welding (e.g., spot welding). On the other hand, the other end sides of the conductive members 30 are arranged into three phases, which are the U-phase, V-phase, and W-phase, respectively, and are electrically connected to one end portion of three power terminals PT (see FIG. 5) provided in the bracket 40, respectively.

Here, the three power terminals PT correspond to the U-phase, V-phase, and W-phase, and the other end portions of these power terminals PT are exposed inside a connector connection portion CN (see FIG. 2, FIG. 3, and FIG. 5) to which a connector member (not shown) on the vehicle side is connected.

<Rotor>

As shown in FIG. 3, the motor device 10 includes a rotor 31 that rotates with respect to the stator 25. The rotor 31 has a rotary shaft 32 and a rotor body 33. The rotary shaft 32 is formed into a stepped rod shape by cutting a round rod. Specifically, the rotary shaft 32 includes a large diameter portion 32a, a medium diameter portion 32b with a diameter smaller than the large diameter portion 32a, and a small diameter portion 32c with a diameter smaller than the medium diameter portion 32a. In addition, the rotary shaft 32 is configured to penetrate through a through hole 52 provided on the sensor board 50 and to be positioned across the bracket 40 in the axial direction thereof.

A rotor core 34 forming a rotor body 33 is fixed to the outer circumferential portion of the large diameter portion 32a by press-fitting or the like. As a result, the rotary shaft 32 rotates as the rotor core 34 rotates. In addition, the bearing support portion 32d is provided on the other side in the axial direction (lower side in FIG. 3) of the large diameter portion 32a, and the bearing support portion 32d is rotatably supported by the first bearing BR1.

Further, a sensor magnet unit SMU is fixed to the outer circumferential portion of the medium diameter portion 32b. The sensor magnet unit SMU includes a holder member 38 and a sensor magnet SM. The holder member 38 is fixed to the medium diameter portion 32b of the rotary shaft 32 by press-fitting and holds the annular sensor magnet SM. Then, the sensor magnet SM is used to detect the rotational state of the rotor 31 (rotary shaft 32) and rotates as the rotary shaft 32 rotates.

Furthermore, the small diameter portion 32c is rotatably supported by a second bearing BR2. In this way, two sides in the axial direction of the rotary shaft 32 are rotatably supported by the first bearing BR1 and the second bearing BR2. In addition, both the first bearing BR1 and the second bearing BR2 are ball bearings (details not shown).

Furthermore, a pinion gear portion 32e that forms an output portion of the motor device 10 is integrally provided on the one side in the axial direction (upper side in FIG. 3) of the small diameter portion 32c. Specifically, the pinion gear portion 32e is connected to, for example, a feed screw shaft (not shown) that advances and retreats a piston of the electric brake device so as to be capable of transmitting power.

Furthermore, the rotor body 33 fixed to the outer circumferential portion of the large diameter portion 32a includes the rotor core 34 formed into a substantially cylindrical shape by laminating multiple thin steel plates (ferromagnetic body) and a cylindrical magnet 35 mounted outside in the radial direction of the rotor core 34. Then, the outside in the radial direction of the magnet 35 is covered by a cylindrical magnet cover 36 made of a stainless steel plate or the like.

The magnet cover 36 is fixed to the outer circumferential portion of the magnet 35 by caulking one side in the axial direction of the magnet cover 36 (upper side in FIG. 3) inward in the radial direction. As a result, the rotation center of the magnet 35 and the rotation center of the rotor core 34 match with high accuracy, and uneven rotation of the rotor 31 is suppressed. Further, the air gap AG between the rotor body 33 and the stator 25 may be narrowed, and a compact and high output (high efficiency) motor device 10 may be implemented.

In addition, to suppress the transmission of the caulking force of the magnet cover 36 to the magnet 35, a magnet protection member 37 made of a resin material such as plastic is provided on the one side in the axial direction of the magnet cover 36.

In this way, the motor device 10 becomes a surface permanent magnet (SPM type) in which the magnet 35 is mounted to the surface of the rotor core 34. However, the motor device 10 is not limited to the SPM type as described above, which may also be an interior permanent magnet (IPM type) in which the magnet is embedded in the interior of the rotor core.

<Bracket>

As shown in FIG. 3 and FIG. 5, the bracket 40 has a function of fixing the motor device 10 to the object to be driven. The bracket 40 is formed into a substantially disk shape by injection molding a molten resin material such as plastic.

The bracket 40 includes a partition wall portion 41 formed into a substantially disk shape. The partition wall portion 41 partitions the case 20 side (lower side in FIG. 3) and the object to be driven side (upper side in FIG. 3), and an insertion cylindrical portion 42, into which the one side in the axial direction (upper side in FIG. 3) of the rotary shaft 32 is inserted, is integrally provided in the center of the partition wall portion 41.

Further, inside the radial direction of the insertion cylindrical portion 42, a bearing holder 43 formed into a substantially cup shape is provided by pressing a steel plate or the like. Specifically, the outside in the radial direction of the bearing holder 43 is fixed to the inside in the radial direction of the insertion cylindrical portion 42.

Then, the bearing holder 43 is provided with an insertion hole 43a into which the rotary shaft 32 is inserted, and the bearing holder 43 holds the second bearing BR2 so as to be coaxial with the insertion cylindrical portion 42. In addition, an annular fixing plate 44 is provided on the other side in the axial direction (lower side in FIG. 3) of the second bearing BR2 to prevent the second bearing BR2 from falling off from the bearing holder 43.

Furthermore, the sensor board 50 is provided on the other side in the axial direction (lower side in FIG. 3) of the insertion cylindrical portion 42. Specifically, the sensor board 50 is fixed to the case 20 side of the partition wall portion 41 by a total of three second male thread members S2 (see FIG. 5). In addition, the sensor board 50 is positioned with high precision by a total of three positioning projections 45. Thus, the hall element 51 of the sensor board 50 and the sensor magnet SM of the rotary shaft 32 accurately face each other in the axial direction of the rotary shaft 32.

<Sensor Board>

The sensor board 50 is configured between the second bearing BR2 and the sensor magnet SM on the case 20 side (lower side in FIG. 3) of the bracket 40. Then, as shown in FIG. 5, a total of three hall elements 51 are mounted on the mounting surface SF of the sensor board 50. Specifically, these hall elements 51 are configured in the periphery of the through hole 52 configured approximately in the center of the sensor board 50.

Here, a total of three hall elements 51 detect changes in the magnetic poles of the sensor magnet SM as the rotary shaft 32 rotates. That is, the hall elements 51 detect the rotational state of the sensor magnet SM (rotary shaft 32).

Furthermore, the sensor board 50 is provided with a total of five through holes TH to which one end portions of a total of five sensor terminals ST are electrically connected. In addition, the other end portions of a total of five sensor terminals ST are exposed inside the connector connection portion CN to which the connector member (not shown) on the vehicle side is connected (see FIG. 2, FIG. 3, and FIG. 5).

<Cylindrical Wall Portion>

As shown in FIG. 1 and FIG. 3, the outside in the radial direction of the insertion cylindrical portion 42 is provided with a cylindrical wall portion 46 with a diameter larger than that of the insertion cylindrical portion 42. Specifically, the cylindrical wall portion 46 is integrally provided on the outside in the radial direction of the partition wall portion 41.

The cylindrical wall portion 46 is configured coaxially with respect to the insertion cylindrical portion 42 and extends in the axial direction of the rotary shaft 32. Further, a total of three fixing portions 47 of the object to be driven are integrally provided on the cylindrical wall portion 46. These fixing portions 47 of the object to be driven are provided with a metal cylindrical collar CL. As a result, the motor device 10 may be securely fixed to the object to be driven without damaging the fixing portions 47 of the object to be driven made by resin. In addition, a fixing bolt (not shown) for fixing the motor device 10 to the object to be driven is inserted into the collar CL.

Furthermore, the connector connection portion CN is integrally provided on the outside in the radial direction of the cylindrical wall portion 46. The connector connection portion CN is formed into a substantially rectangular parallelepiped shape and may be connected to the connector member (not shown) on the vehicle side from the other side in the axial direction (lower side in FIG. 3) of the cylindrical wall portion 46.

Further, a total of three case fixing portions 48 are integrally provided on the cylindrical wall portion 46. These case fixing portions 48 are portions to which the flange portion 24 of the case 20 are fixed, and each holds a cylindrical female thread member IT made of steel. A first male thread member S1 for fixing the case 20 to the bracket 40 is screwed to each of these female thread members IT.

<Fitting Cylindrical Portion>

Furthermore, on the other side in the axial direction (case 20 side) of the bracket 40 and between the insertion cylindrical portion 42 and the cylindrical wall portion 46 in the radial direction of the bracket 40, a fitting cylindrical portion 49 is integrally provided.

The fitting cylindrical portion 49 is a portion fitted to the opening portion 22 of the case 20 and has an annular seal SL made of an elastic material, such as rubber, mounted on the outside in the radial direction. The annular seal SL seals between the bracket 40 and the case 20.

<Split Core Structure>

Figure 6:
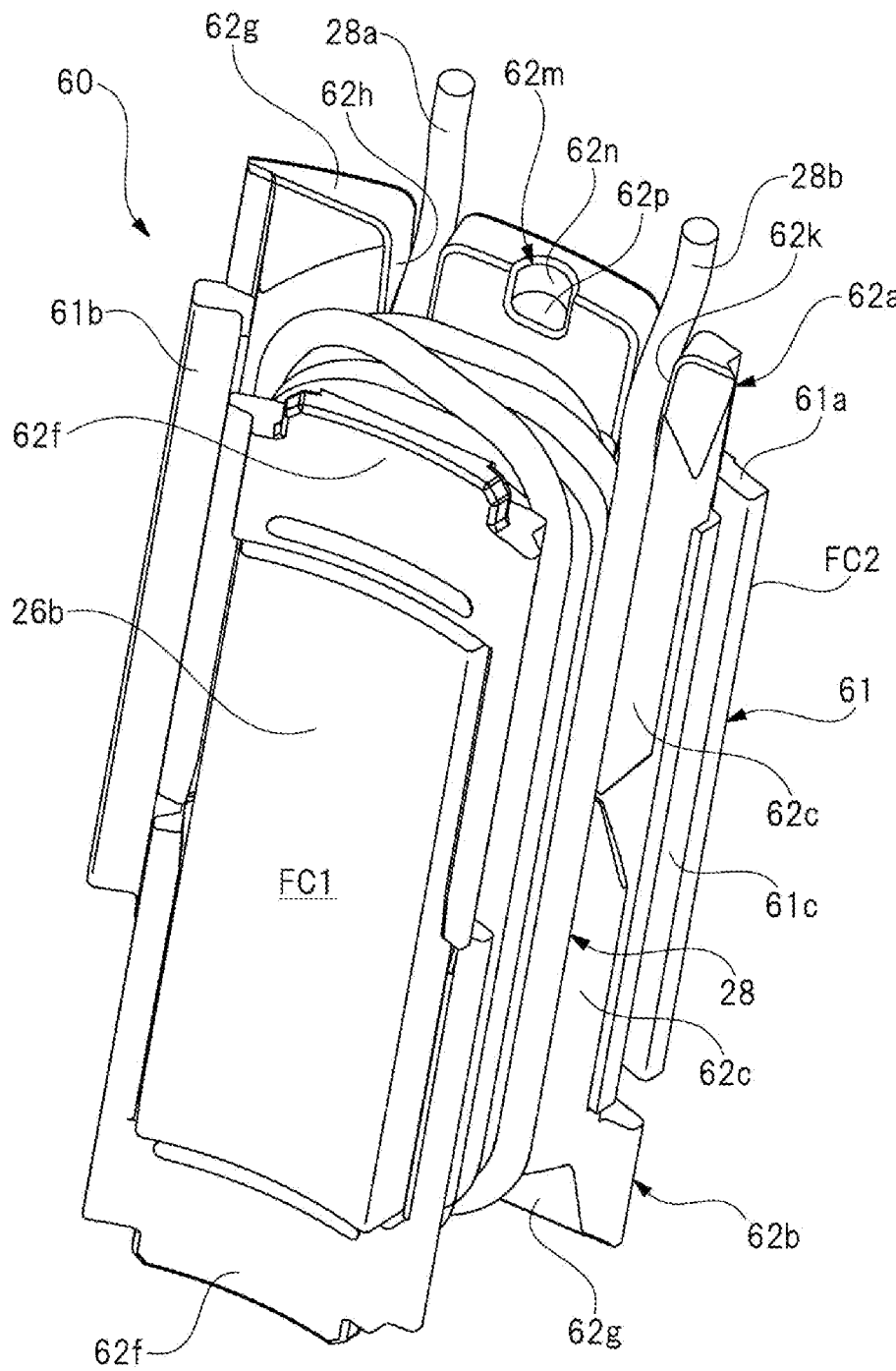
FIG. 6 is a perspective view showing a single split core.
Figure 7:
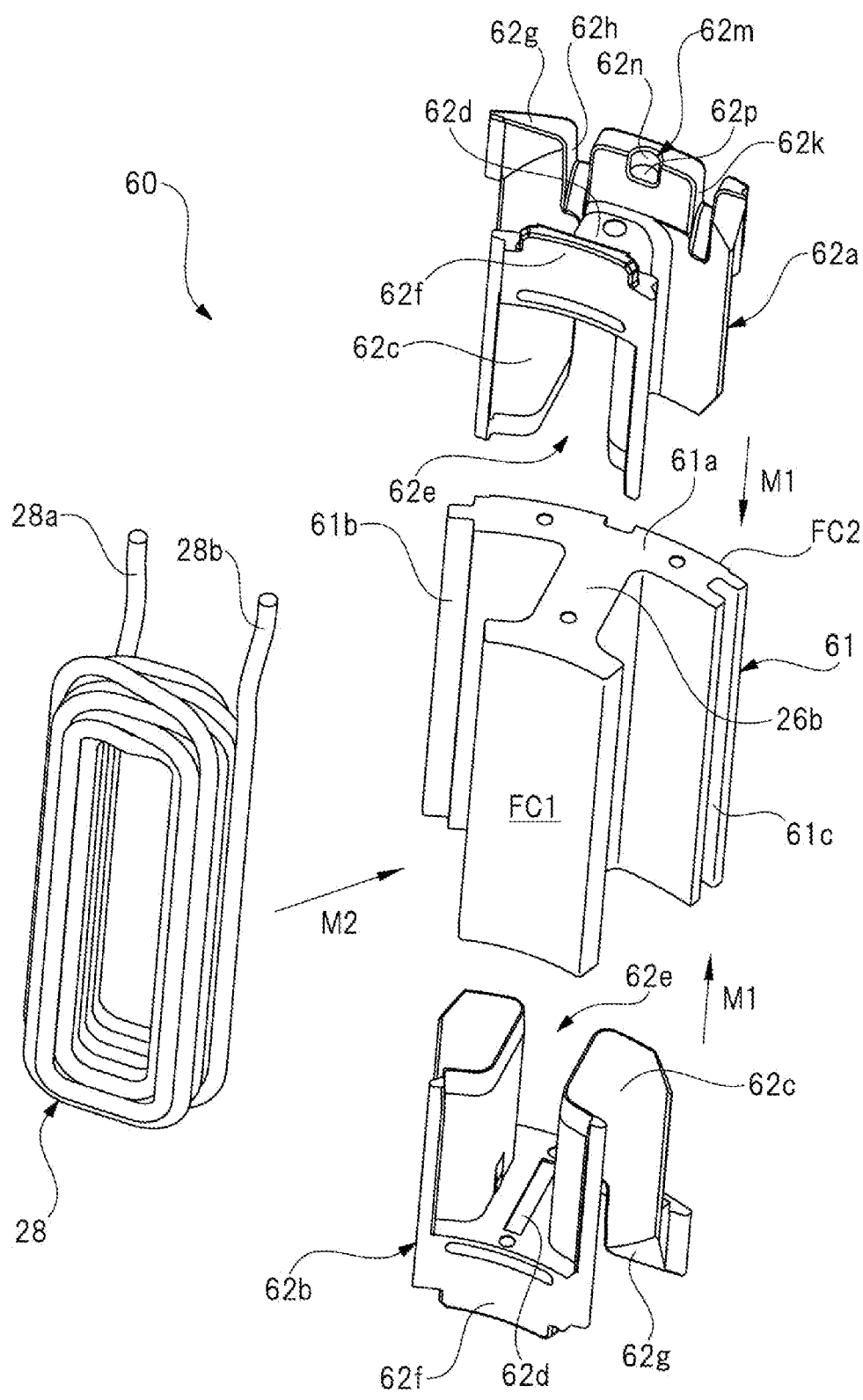
FIG. 7 is an exploded perspective view of the split core.
Figure 8:
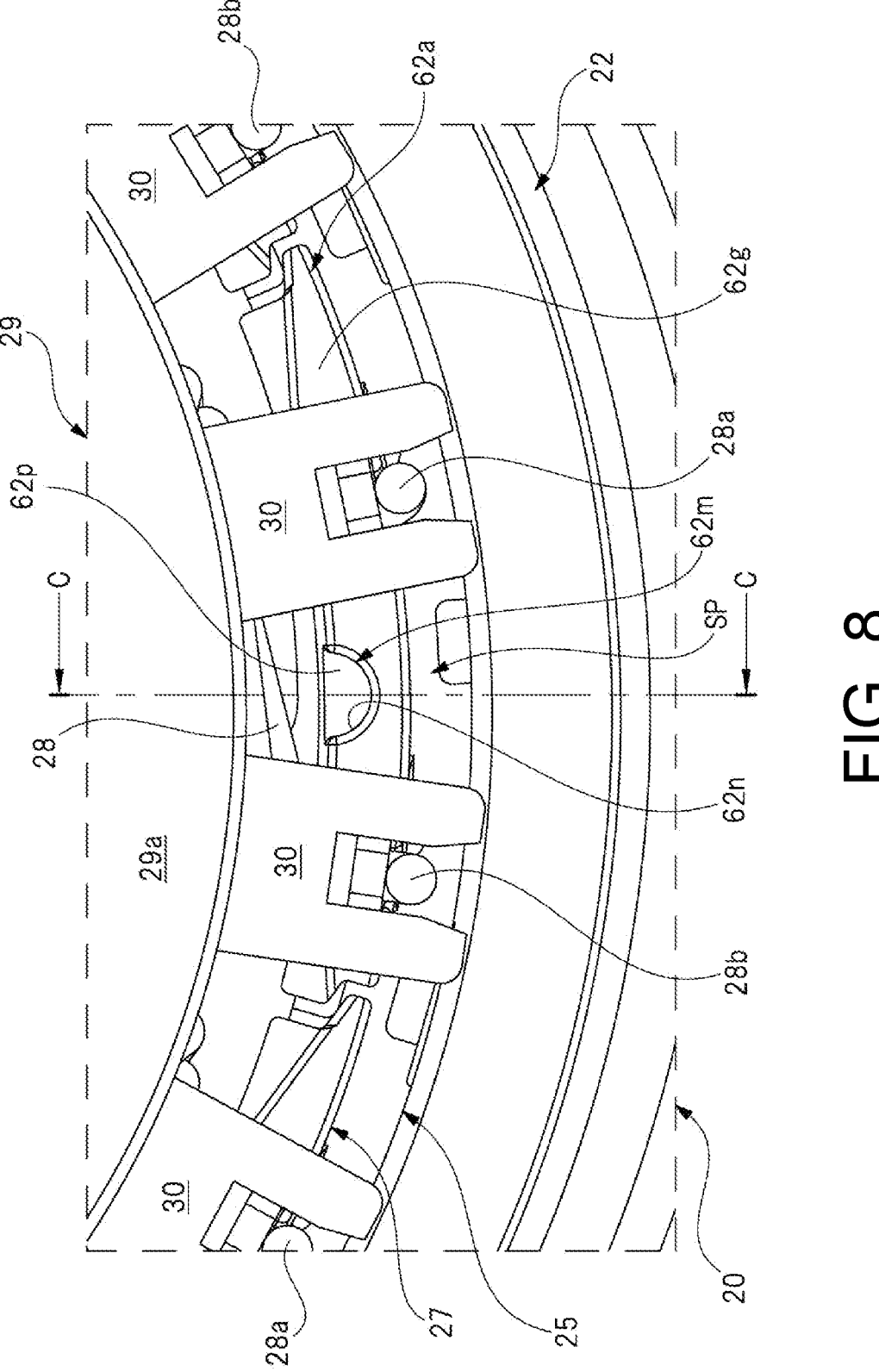
FIG. 8 is an enlarged view of the dashed circle A in FIG. 4 viewed from the direction of the arrow B.

FIG. 6 shows a perspective view showing a single split core; FIG. 7 shows an exploded perspective view of the split core; and FIG. 8 shows an enlarged view of the dashed circle A in FIG. 4 viewed from the direction of the arrow B, respectively.

The stator 25 (see FIG. 3) accommodated in the interior of the case 20 is formed into an annular shape by connecting the split core 60 shown in FIG. 6 to the case 20 in the circumferential direction. Specifically, the stator 25 is formed by connecting a total of nine split cores 60 formed into the same shape. In other words, the stator 25 is a "9-slot type".

The split core 60 includes a stator core split body 61 forming part of the stator core 26 (see FIG. 3); a first insulator split body 62a and a second insulator split body 62b forming an insulator member 27 (see FIG. 3); and the coil 28 forming any one of three phases: U-phase, V-phase, and W-phase.

<Stator Core Split Body>

As shown in FIG. 7, the stator core split body 61 has a stator body split body 61a that forms part of the core body 26a (see FIG. 3). Here, the stator body split body 61a corresponds to the stator body in the disclosure.

The stator body split body 61a is formed into a substantially arc shape when the split core 60 is viewed from the axial direction of the rotor 31 (see FIG. 3). Further, the stator body split body 61a is integrally provided with the base end side of the teeth 26b that protrudes toward the rotor 31. In addition, the teeth 26b are formed into a substantially T-shape when the split core 60 is viewed from the axial direction of the rotor 31.

The stator body split body 61a is provided with a connecting protrusion portion 61b protruding on the one side in the lateral direction of the stator body split body 61a (left side in FIG. 7). In contrast, the other side in the lateral direction (right side in FIG. 7) of the stator body split body 61a is provided with a connecting recessed portion 61c that is recessed into the one side in the lateral direction of the stator body split body 61a. Then, the connecting protrusion portion 61b is connected to the connecting recessed portion (not shown) of an adjacent stator body split body, and the connecting recessed portion 61c is connected to the connecting protrusion portion (not shown) of an adjacent stator body split body.

<First, Second Insulator Split Body>

As shown in FIG. 7, the first and second insulator split bodies 62a and 62b are configured to face each other in the axial direction of the rotor 31 so as to sandwich the stator core split body 61 therebetween. The first and second insulator split bodies 62a and 62b cover most other parts of the stator core split body 61 except for the inner circumferential surface FC1 and the outer circumferential surface FC2. Specifically, the first and second insulator split bodies 62a and 62b are mounted to the teeth 26b from one side in the longitudinal direction (upper side in FIG. 7) and the other side in the longitudinal direction (lower side in FIG. 7) of the stator core split body 61, respectively.

Here, the first and second insulator split bodies 62a and 62b are both formed into the same shape from a resin material (insulator) such as plastic. Hereinafter, only the structure of the first insulator split body 62a configured on the one side in the longitudinal direction of the stator core split body 61 is described in detail.

In addition, the first insulator split body 62a corresponds to the insulator in the disclosure. Further, the same parts of the second insulator split body 62b as those of the first insulator split body 62a are given the same symbols.

The first insulator split body 62a includes a covering portion 62c formed into a substantially U-shape. The covering portion 62c is a portion that covers the teeth 26b of the stator core split body 61 and has a bottom portion 62d on the one side (upper side in FIG. 7) of the first insulator split body 62a in the axial direction of the rotor 31 and an opening portion 62e on the other side (lower side in FIG. 7). The teeth 26b are then assembled from the opening portion 62e to the inside of the covering portion 62c.

In addition, the bottom portion 62d of the covering portion 62c is integrally provided with an inner support wall 62f configured on the inside of the first insulator split body 62a in the radial direction of the rotor 31 and an outer support wall 62g configured on the outside of the first insulator split body 62a in the radial direction of the rotor 31. That is, the inner support wall 62f and the outer support wall 62g are provided on the one side of the first insulator split body 62a in the axial direction of the rotor 31. Specifically, the inner support wall 62f and the outer support wall 62g protrude toward the one side of the first insulator split body 62a in the axial direction of the rotor 31 from the bottom portion 62d with a predetermined height.

In addition, the inner support wall 62f and the outer support wall 62g have the function of supporting the coil 28, which are wrapped around the first insulator split body 62a, from inside and outside in the radial direction of the rotor 31. Thereby, the coil 28 may be wounded around the first insulator split body 62a with a predetermined tension, and the occurrence of so-called "winding collapse" of the coil 28 is prevented.

Here, the first and second insulator split bodies 62a and 62b are assembled from the one side in the longitudinal direction and the other side in the longitudinal direction of the stator core split body 61, as shown by the arrow M1 in FIG. 7. Then, when the first and second insulator split bodies 62a and 62b are assembled to the stator core split body 61, as shown by the arrow M2, the coil 28 is wounded around the covering portion 62c of the first and second insulator split bodies 62a and 62b.

<Outer Support Wall>

The outer support wall 62g provided on the first insulator split body 62a is arranged in a direction that intersects with the axial direction of the rotor 31 and provided with a first coil end support groove 62h and a second coil end support groove 62k. Each of these first and second coil end support grooves 62h and 62k are made by cutting out the outer support wall 62g in the protruding direction thereof (axial direction of the rotor 31).

Then, the first coil end support groove 62h is configured on the one side in the longitudinal direction (left side in FIG. 7) of the outer support wall 62g, and the second coil end support groove 62k is configured on the other side in the longitudinal direction (right side in FIG. 7) of the outer support wall 62g. Further, as shown in FIG. 7, the first coil end support groove 62h is configured closer to the teeth 26b than the second coil end support groove 62k in a direction that intersects with the axial direction of the rotor 31.

This allows the winding start portion 28a of the coil 28 to be supported by the first coil end support groove 62h and the winding end portion 28b of the coil 28 to be supported by the second coil end support groove 62k. In this way, the first and second coil end support grooves 62h and 62k have the function to determine the position of the winding start portion 28a and the winding end portion 28b with respect to the first insulator split body 62a.

As a result, each of the winding start portion 28a and the winding end portion 28b of the coil 28 may be easily welded (electrically connected) to the conductive members 30 of the busbar unit 29 (see FIG. 8). Here, the winding start portion 28a and the winding end portion 28b correspond to a pair of the end portions of the coil in the disclosure and is configured on the one side of the first insulator split body 62a in the axial direction of the rotor 31.

Further, in the longitudinal direction of the outer support wall 62g, that is, the direction that intersects with the axial direction of the rotor 31, a recessed portion 62m is provided between the first coil end support groove 62h and the second coil end support groove 62k. The recessed portion 62m are configured exactly in the middle between the first coil end support groove 62h and the second coil end support groove 62k. That is, the recessed portion 62m is configured between the winding start portion 28a and the winding end portion 28b of the coil 28 (between the pair of the end portions of the coil) in a direction that intersects with the axial direction of the rotor 31.

Figure 9:
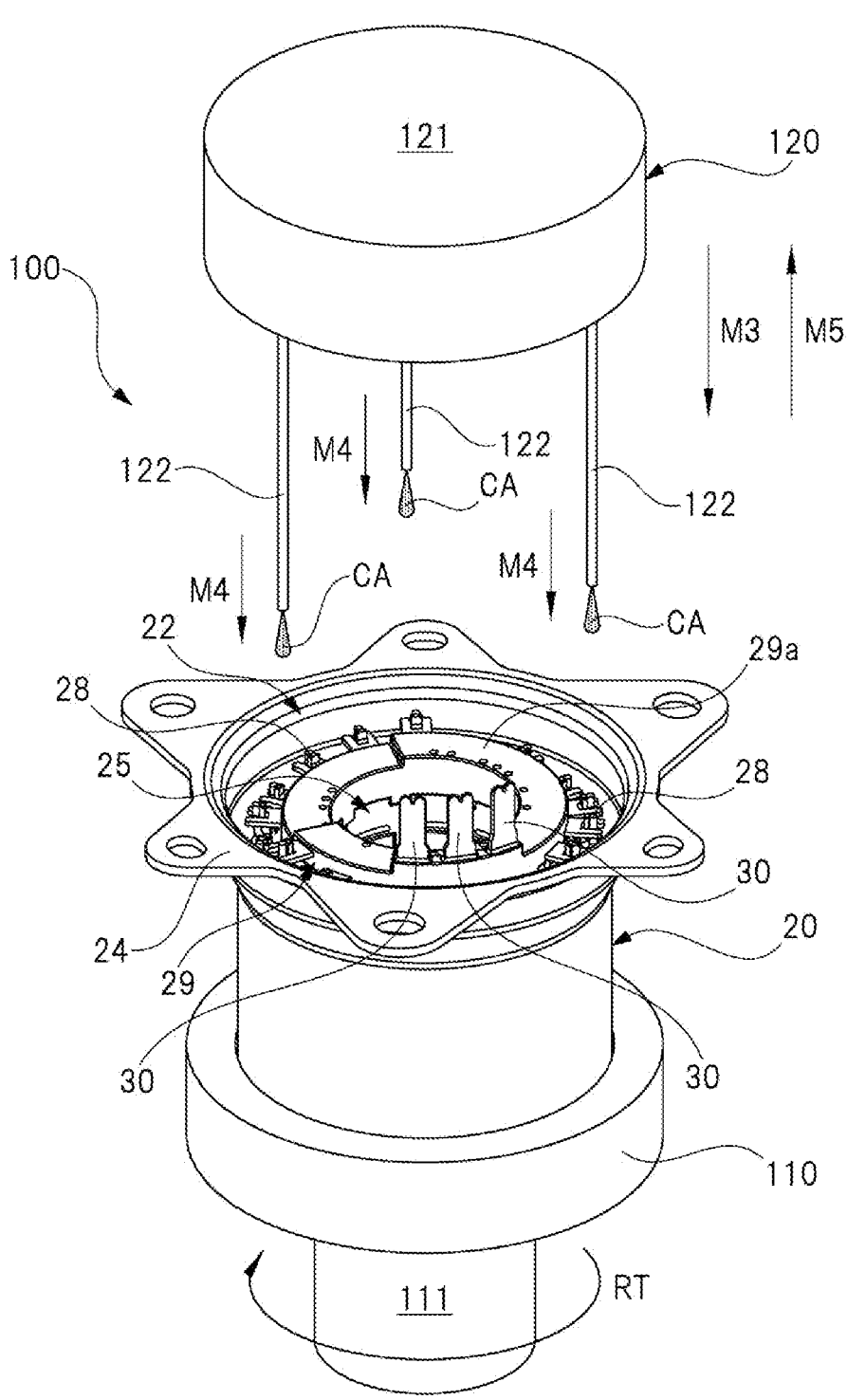
FIG. 9 is a perspective view showing an overview of the coating device that coats the coating agent.
Figure 10:
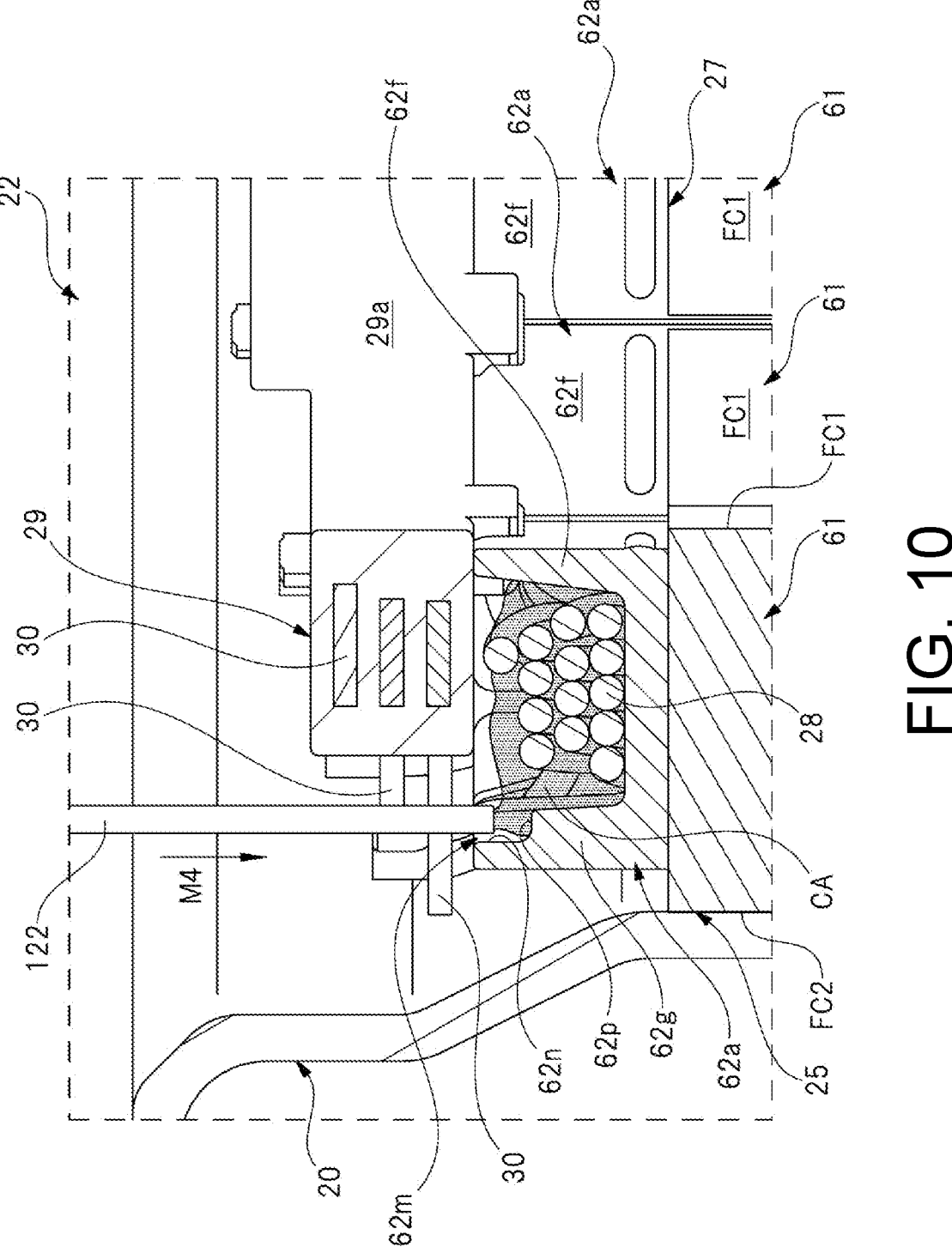
FIG. 10 is a cross-sectional view taken along the line C-C in FIG. 8, illustrating the coating agent coating procedure.

Then, the recessed portion 62m open toward the inner support wall 62f and toward the one side of the first insulator split body 62a in the axial direction of rotor 31. In this way, as shown in FIG. 9 and FIG. 10, when assembling the motor device 10 (see FIG. 3), the tip portion of the nozzle 122 of the coating device 100 faces the recessed portion 62m of the first insulator split body 62a, and the coating agent CA may be coated on the coil 28 between the inner support wall 62*f* and the outer support wall 62*g* from the nozzle 122 via the recessed portion 62*m*. In addition, the coating operation of the coating agent CA by the coating device 100 is described in detail later.

Here, as shown in FIG. 8, the recessed portion 62*m* is formed into a substantially semicircular shape when the stator 25 is viewed from the one side in the axial direction (upper side in FIG. 3). Specifically, the recessed portion 62*m* has an arc-shaped side wall 62*n* and a semicircular bottom wall 62*p*. As a result, in the interior of the recessed portion 62*m*, even if the tip portion of the nozzle 122 (see FIG. 9) comes into contact with the arc-shaped side wall 62*n*, the stress received from the nozzle 122 at that time may be dispersed. In other words, damage to the first insulator split body 62*a* caused by the misalignment of the nozzle 122 may be effectively suppressed. Moreover, by making the recessed portion 62*m* semicircular, the mold may be easily released after injection molding the first insulator split body 62*a*.

Furthermore, as shown in FIG. 8, a state in which the busbar unit 29 is mounted to the stator 25, that is, in a state where the conductive members 30 of the busbar unit 29 and the winding start portion 28*a* and the winding end portion 28*b* of the coil 28 are fixed to each other by welding, the recessed portion 62*m* is configured in a gap SP between adjacent conductive members 30 when viewed from the one side in the axial direction of the stator 25. Specifically, the conductive member 30 is provided on the one side of the stator 25 in the axial direction of the rotor 31 and extends across the first insulator split body 62*a* toward the radial direction of the rotor 31.

Then, the gap SP between the adjacent conductive members 30 is formed into a substantially fan shape when the stator 25 is viewed from the one side in the axial direction (upper side in FIG. 3). Specifically, the inside of the gap SP in the radial direction of the rotor 31 is narrow, and the outside of the gap SP in the radial direction of the rotor 31 is wide. Thus, to insert the nozzle 122 into the widest possible portion of the gap SP (see FIG. 9), the recessed portion 62*m* is provided on the outer support wall 62*g*.

<Coating Agent Coating Procedure>

Next, a method to assemble the motor device 10 formed as described above, in particular, a method to supply the coating agent CA to the stator 25 fixed to the interior of case 20, in other words, a method to coat the coating agent CA to the coil 28 is described in detail with reference to the drawings.

FIG. 9 shows a perspective view showing an overview of the coating device that coats the coating agent; FIG. 10 shows a cross-sectional view taken along the line C-C in FIG. 8, illustrating the coating agent coating procedure; and FIG. 11 shows a view taken along the arrow B in FIG. 4 (rotor omitted), illustrating the coating agent coating procedure, respectively.

First, an overview of the coating device 100 that coats the coating agent CA is described.

As shown in FIG. 9, the coating device 100 includes a turntable 110 and a dispenser 120. The turntable 110 is rotatable with the case 20 placed thereon and is rotated as the drive shaft 111 rotates toward the direction of the arrow RT. Further, the dispenser 120 is configured coaxially with respect to the turntable 110 and may be raised and lowered by a lifting mechanism (not shown) above the turntable 110.

Then, the base end portions of a total of three nozzles 122 are attached to the lower side of the body portion 121 of the dispenser 120, that is, on the turntable 110 side. These nozzles 122 are configured in the circumferential direction of the body portion 121 at intervals of 120 degrees. Then, a predetermined amount of the coating agent CA is dispensed from the tip portion of each of the nozzles 122.

Specifically, a total of three nozzles 122, as shown in FIG. 11, correspond to the three recessed portions 62*m* in sign (A), the three recessed portions 62*m* in sign (B), and the three recessed portions 62*m* in sign (C) configured at intervals of 120 degrees, and may be inserted into each of these recessed portions (see FIG. 10). In other words, in this embodiment, since the stator 25 is a "9-slot type", the coating agent CA is coated in three times for: group (A), group (B), and group (C) by a total of three nozzles 122.

When performing the coating operation using the coating device 100, the stator 25 to which the busbar unit 29 is fixed (with the coil 28 and the conductive members 30 already welded) and the case 20 are prepared. Then, the stator 25 (with the busbar unit 29) is press-fitted into the case 20 and fixed. Up to this point, this is the first stage of the coating operation with the coating device 100.

Next, as shown in FIG. 9, the case 20 (with the stator 25 fixed), which has completed the previous operation as described above, is set on the turntable 110. Afterwards, as shown by the arrow M3, the dispenser 120 is lowered and the tip portions of a total of three nozzles 122 are inserted into the recessed portions 62*m* of group (A) (see FIG. 11). Specifically, as shown in FIG. 10, the nozzles 122 are inserted so that the tip portions do not touch the arc-shaped side wall 62*n* and the semicircular bottom wall 62*p* of the recessed portions 62*m*.

Then, as shown by the arrow M4 in FIG. 9 and FIG. 10, the dispenser 120 is operated to dispense a predetermined amount of the coating agent CA from the tip portions of the nozzles 122. Then, as shown in FIG. 10, the coating agent CA dispensed from the nozzle 122 reaches the coil 28 configured between the inner support wall 62*f* and outer support wall 62*g* of the first insulator split body 62*a* through the semicircular bottom wall 62*p* of the recessed portion 62*m*.

As a result, the coating agent CA also enters the gap so as to cover the periphery of the coil 28. Furthermore, as shown in FIG. 3, the coating agent CA travels through the coil 28 by gravity to reach the lower portion of the insulator member 27 (part of the second insulator split body 62*b*). Thus, as shown in the shaded area in FIG. 3, the coating agent CA is evenly coated on cover the periphery of the coils 28 and is accumulated in the annular coating agent storage portion 23*a*.

Next, the coating device 100 moves to coat the coating agent CA to the coils 28 corresponding to the group (B) via the recessed portions 62*m* of the group (B) (see FIG. 11). Specifically, first, the dispenser 120 is raised as shown by the arrow M5 in FIG. 9. At this time, the dispense operation of the coating agent CA is in a stopped state.

Afterwards, the turntable 110 is rotated with a predetermined angle in the direction of the arrow RT. Specifically, the turntable 110 is rotated by 40 degrees in the direction of the arrow RT so that the nozzles 122 of the dispenser 120 face the recessed portions 62*m* of group (B), respectively. That is, the feed angle of the turntable 110 for each operation is "40 degrees."

Then, as described above, the dispenser 120 is lowered and the tip portions of the nozzles 122 are inserted into the recessed portions 62*m* of group (B) (see FIG. 11), respectively, and the coating agent CA is dispensed. This completes the coating of the coating agent CA to the coils 28 corresponding to group (B).

Subsequently, the coating agent CA is coated on the coils 28 corresponding to the group (C) via the recessed portions 62*m* of the group (C) (see FIG. 11). In this case, the coating device 100 operates in the same manner as described above to perform the coating operation.

Here, the amount of the coating agent CA is set in advance to a specified amount. Thus, when the supply of the coating agent CA to the recessed portions 62*m* in groups (A), (B) and (C) is completed (completion of the coating operation), the coating agent CA does not reach the first bearing BR1 beyond the bearing mounting cylindrical portion 23*b*, as shown in FIG. 3.

As detailed above, this embodiment includes multiple conductive members 30, provided on the one side of the stator 25 in the axial direction of the rotor 31, extending across the first insulator split body 62*a* toward the radial direction of the rotor 31, and electrically connected to the winding start portion 28*a* and the winding end portion 28*b* of the coil 28; the inner support wall 62*f* and the outer support wall 62*g*, provided on the one side of the first insulator split body 62*a* in the axial direction of the rotor 31 and supporting the coil 28, which are wrapped around the first insulator split body 62*a*, from inside and outside in the radial direction of the rotor 31; and the recessed portion 62*m*, provided on the outer support wall 62*g*, opening toward the inner support wall 62*f* and toward the one side of the first insulator split body 62*a* in the axial direction of the rotor 31. The recessed portion 62*m* is configured between adjacent conductive members 30 when the stator 25 is viewed from one side in the axial direction.

As a result, the conductive members 30 of the busbar unit 29 and the winding start portion 28*a* and the winding end portion 28*b* of the coil 28 are fixed to each other by welding, and even after the welded stator 25 is press-fitted into the case 20 and fixed, the coating agent CA is allowed to be coated on the coil 28 through the recessed portion 62 *m* from the gap SP between the adjacent conductive members 30.

Thus, damage to the surface of the coating agent CA, such as part of the coating agent CA coming off due to welding spatter (fine metal particles) may be prevented, and manufacturing defects of the motor device 10 may be eliminated. Thus, the occurrence of defective products may be suppressed and the manufacturing efficiency may be improved.

Further, in this embodiment, the recessed portion 62*m* is formed into a substantially semicircular shape when the stator 25 is viewed from the one side in the axial direction and has an arc-shaped side wall 62*n* and a semicircular bottom wall 62*p*.

Thereby, even if the tip portion of the nozzle 122 comes into contact with the arc-shaped side wall 62*n*, the stress received from the nozzle 122 may be dispersed. Thus, damage to the first insulator split body 62*a* may be suppressed. Moreover, by making the recessed portion 62*m* substantially semicircular, the mold may be easily released after injection molding the first insulator split body 62*a*.

Furthermore, in this embodiment, the pair of the winding start portion 28*a* and the winding end portion 28*b* of the coil 28 are configured on the one side of the first insulator split body 62*a* in the axial direction of the rotor 31, and the recessed portion 62*m* is configured between the pair of the winding start portion 28*a* and the winding end portion 28*b* of the coil 28 in a direction that intersects with the axial direction of the rotor 31.

In this way, the coating agent CA may be evenly distributed over the coil 28 wrapped around the first insulator split body 62*a*. Thus, the entire coil 28 may be protected more reliably.

Further, according to the disclosure, the production efficiency may be improved by suppressing the occurrence of defective products in the motor device 10, thereby saving the manufacturing energy. In this way, especially Goal 7 (ensure access to affordable, reliable, sustainable and modern energy for all) and Goal 13 (take urgent action to combat climate change and its impacts) in the Sustainable Development Goals (SDGs) set by the United Nations may be realized.

The disclosure is not limited to the embodiment described above, and may be modified in various ways without departing from the gist thereof. For example, in the embodiment described above, the stator 25 of the motor device 10 is a "9-slot type", but the disclosure is not limited thereto and may also be applied to a motor device having a stator with a number of slots other than the "9-slot type".

Further, in the embodiment described above, although the motor device 10 is a drive source for an electric brake device mounted on a vehicle such as an automobile, the disclosure is not limited thereto and may also be applied to drive sources of other in-vehicle equipment (drive sources of electric power steering, etc.).

In addition, the material, shape, size, number, installation location, etc. of each component in the embodiment described above are arbitrary as long as they may achieve the disclosure, and are not limited to the embodiment described above.

What is claimed is:

1. A motor device, comprising:
a stator; and
a rotor, rotating with respect to the stator,
wherein the stator comprises:
a stator body;
teeth, provided on the stator body and protruding toward the rotor;
an insulator, mounted to the teeth; and
a coil, wrapped around the insulator,
wherein the motor device comprises:
a plurality of conductive members, provided on one side of the stator in an axial direction of the rotor, extending across the insulator toward a radial direction of the rotor, and electrically connected to end portions of the coil;
an inner support wall and an outer support wall, provided on one side of the insulator in the axial direction of the rotor and supporting the coil, which are wrapped around the insulator, from inside and outside in the radial direction of the rotor; and
a nozzle insertion recess, provided on the outer support wall, opening toward the inner support wall and toward the one side of the insulator in the axial direction of the rotor,
wherein the nozzle insertion recess is configured between adjacent conductive members when the stator is viewed from one side in the axial direction for inserting a nozzle and receiving coating agent from the nozzle.

2. The motor device according to claim 1, wherein the nozzle insertion recess is formed into a substantially semicircular shape when the stator is viewed from the one side in the axial direction and has an arc-shaped side wall and a semicircular bottom wall.

3. The motor device according to claim 1, wherein
a pair of end portions of the coil are configured on the one side of the insulator in the axial direction of the rotor, and the nozzle insertion recess is configured between the pair of the end portions of the coil in a direction that intersects with the axial direction of the rotor.

* * * * *